United States Patent
Minami

(10) Patent No.: US 12,401,058 B2
(45) Date of Patent: Aug. 26, 2025

(54) SULFIDE-BASED SOLID ELECTROLYTE

(71) Applicant: TOYOTA JIDOSHA KABUSHIKI KAISHA, Toyota (JP)

(72) Inventor: Keiichi Minami, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 496 days.

(21) Appl. No.: 18/077,050

(22) Filed: Dec. 7, 2022

(65) Prior Publication Data

US 2023/0268549 A1    Aug. 24, 2023

(30) Foreign Application Priority Data

Feb. 18, 2022    (JP) .................................. 2022-023370

(51) Int. Cl.
    *H01M 10/0562*    (2010.01)

(52) U.S. Cl.
    CPC .................. *H01M 10/0562* (2013.01); *H01M 2300/0068* (2013.01)

(58) Field of Classification Search
    CPC ........................................ H01M 10/0561–0562
    See application file for complete search history.

(56) References Cited

PUBLICATIONS

Jianwen Liang, et al., "Li10Ge(P1-xSbx)2S12 Lithium-Ion Conductors with Enhanced Atmospheric Stability", Chemistry of Materials, Jan. 30, 2020, 2664-2672.

*Primary Examiner* — Jonathan G Leong
(74) *Attorney, Agent, or Firm* — Sughrue Mion, PLLC

(57) ABSTRACT

A sulfide-based solid electrolyte having a composition represented by $Li_aGe_{1+b}Sb_cP_{2-b-c}S_{12}$, wherein $10 \leq a \leq 10.65$, $0.35 \leq b \leq 0.65$, and $0.075 \leq c \leq 0.15$ are satisfied.

2 Claims, 1 Drawing Sheet

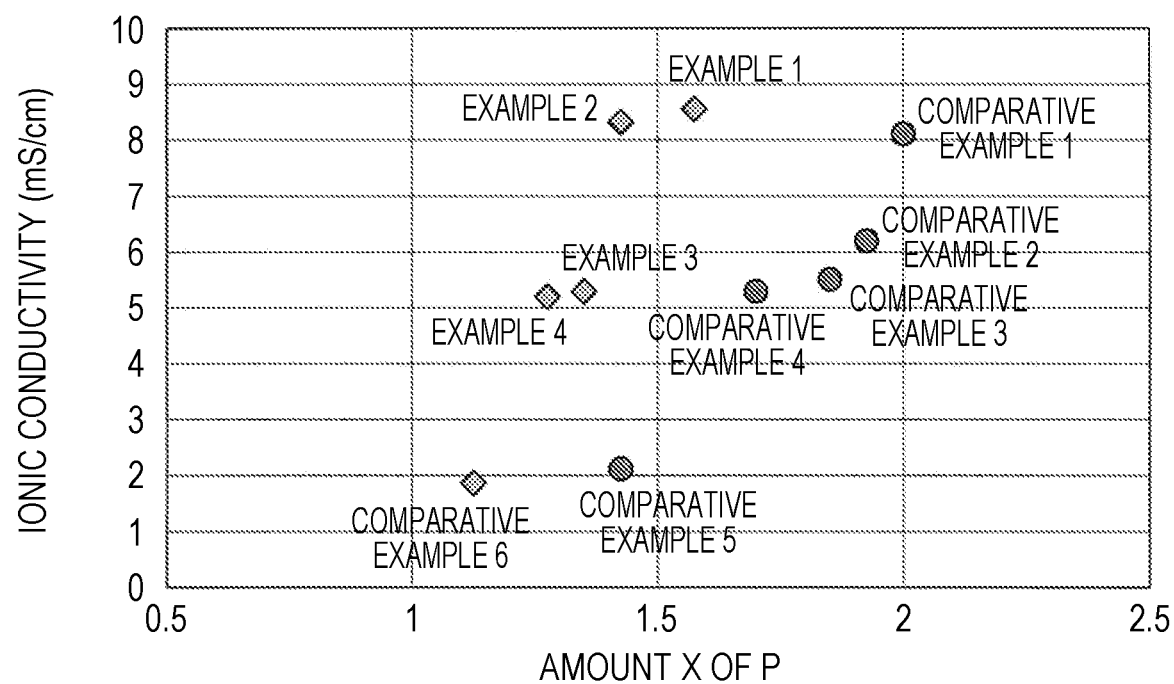

SULFIDE-BASED SOLID ELECTROLYTE

CROSS-REFERENCE TO RELATED APPLICATION

This application claims priority to Japanese Patent Application No. 2022-023370 filed on Feb. 18, 2022, incorporated herein by reference in its entirety.

BACKGROUND

1. Technical Field

The present disclosure relates to a sulfide-based solid electrolyte.

2. Description of Related Art

In recent years, with the rapid spread of information-related devices and communication devices such as personal computers, video cameras and cellular phones, the development of batteries used as power supplies for these devices has been emphasized. In addition, in the automobile industry and the like, the development of high-output and high-capacity batteries for battery electric vehicles or hybrid electric vehicles has progressed.

Chem. Mater. 2020, 32, 2664-2672 discloses a sulfide-based solid electrolyte in which some of P in a $Li_{10}Ge_1P_2S_{12}$ composition is substituted with Sb.

SUMMARY

A sulfide-based solid electrolyte in which some of P in a $Li_{10}Ge_1P_2S_{12}$ composition is substituted with Sb can be expected to have improved water resistance, but the ionic conductivity decreases sharply when P is substituted with Sb. In addition, since the amount of P substituted with Sb cannot be increased, the water resistance is not sufficient.

The present disclosure has been made in view of the above circumstances, and a main object of the present disclosure is to provide a sulfide-based solid electrolyte having high ionic conductivity and high water resistance.

The sulfide-based solid electrolyte of the present disclosure is a sulfide-based solid electrolyte having a composition represented by $Li_aGe_{1+b}Sb_cP_{2-b-c}S_{12}$, wherein $10 \leq a \leq 10.65$, $0.35 \leq b \leq 0.65$, and $0.075 \leq c \leq 0.15$ are satisfied.

In the sulfide-based solid electrolyte of the present disclosure, $0.35 \leq b \leq 0.5$ may be satisfied.

The present disclosure can provide a sulfide-based solid electrolyte having high ionic conductivity and high water resistance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram showing the results of the ionic conductivity with respect to the amount (mol) x of P in sulfide-based solid electrolytes of Examples 1 to 4 and Comparative Examples 1 to 6.

DETAILED DESCRIPTION OF EMBODIMENTS

In this specification, "to" indicating a numerical range means that numerical values stated before and after "to" are included as a lower limit value and an upper limit value.

In addition, any combination of the upper limit value and the lower limit value in the numerical range can be used.

The sulfide-based solid electrolyte of the present disclosure has a composition represented by $Li_aGe_{1+b}Sb_cP_{2-b-c}S_{12}$, wherein $10 \leq a \leq 10.65$, $0.35 \leq b \leq 0.65$, and $0.075 \leq c \leq 0.15$ are satisfied.

The sulfide-based solid electrolyte of the present disclosure has a composition represented by $Li_aGe_{1+b}Sb_cP_{2-b-c}S_{12}$, and a satisfies $10 \leq a \leq 10.65$, b satisfies $0.35 \leq b \leq 0.65$, and c satisfies $0.075 \leq c \leq 0.15$. In the sulfide-based solid electrolyte of the present disclosure, the amount of P substituted with Ge is 0.35 mol to 0.65 mol, and the amount of P substituted with Sb is 0.075 mol to 0.15 mol.

In the sulfide-based solid electrolyte of the present disclosure, in the composition, b may be $0.35 \leq b \leq 0.5$. That is, in the sulfide-based solid electrolyte of the present disclosure, the amount of P substituted with Ge may be 0.35 mol to 0.5 mol.

In the sulfide-based solid electrolyte of the present disclosure, in the composition, there may be 10 mol to 10.65 mol of Li, 1.275 mol to 1.575 mol of P, 1.35 mol to 1.65 mol or 1.35 mol to 1.5 mol of Ge, and 0.075 mol to 0.15 mol of Sb.

In a LGPS type solid electrolyte having a standard composition of $Li_{10}GeP_2S_{12}$, when the P sites are substituted with only Sb, the ionic conductivity decreases even with a small amount of substitution. In addition, since P and Sb differ greatly in ionic radius, the amount of substitution at the P sites is limited.

According to the present disclosure, in the LGPS type solid electrolyte, the LPGS structure can be maintained even in a composition with a small amount of P by substituting some of P with not only Sb but also Ge, the ionic conductivity can be maintained, the water resistance can be improved by reducing the amount of P compared to the conventional composition, and both high ionic conductivity and high water resistance can be achieved.

The sulfide-based solid electrolyte of the present disclosure may be used as a solid electrolyte for various batteries.

The battery may be a primary battery or a secondary battery, and particularly, a secondary battery. The secondary battery can be repeatedly charged and discharged. The secondary battery is useful, for example, as an in-vehicle battery.

The battery may be an aqueous battery, a non-aqueous battery, an all-solid-state battery or the like.

In addition, the battery may be a lithium battery, a lithium ion battery or the like.

In addition, the all-solid-state battery may be an all-solid-state lithium secondary battery, an all-solid-state lithium-ion secondary battery or the like.

Battery applications are not particularly limited, and examples thereof include power supplies for vehicles such as hybrid electric vehicles (HEV), plug-in hybrid electric vehicles (PHEV), battery electric vehicles (BEV), gasoline vehicles, and diesel vehicles. In particular, it may be used as power supplies for driving hybrid electric vehicles, plug-in hybrid electric vehicles or battery electric vehicles. In addition, the battery in the present disclosure may be used as a power supply for moving objects (for example, trains, ships, and aircraft) other than vehicles, and may be used as a power supply for electrical products such as information processing devices.

Example 1

Synthesis of $Li_{10.35}Ge_{1.35}Sb_{0.075}P_{1.575}S_{12}$ $Li_2S$ (commercially available from Furuuchi Chemical Corporation), $GeS_2$ (commercially available from Kojundo Chemical Lab. Co., Ltd.), $Sb_2S_3$ (commercially available from Kojundo Chemical Lab. Co., Ltd.), S (commercially available from Kojundo Chemical Lab. Co., Ltd.), and $P_2S_5$ (commercially available from Aldrich Co. Ltd.) were weighed out in a molar ratio of 10.35:1.35:0.075:0.15:1.575 and mixed in a mortar and then put into a 500 ml $ZrO_2$ pot, and 5 mmφ $ZrO_2$ balls were put thereinto, and stirring was performed under conditions of 300 rpm-1 h for 20 cycles to obtain a precursor. The resultant was fired in a tubular furnace in an Ar flow atmosphere at a temperature higher than the crystallization temperature for 6 h to obtain a Ge- and Sb-substituted LGPS having the above composition.

Example 2

Synthesis of $Li_{10.5}Ge_{1.5}Sb_{0.075}P_{1.425}S_{12}$

A Ge- and Sb-substituted LGPS having the above composition was obtained in the same method as in Example 1 except that weighing was performed so that the molar ratio at the time of weighing was $Li_2S:GeS_2:Sb_2S_3:S:P_2S_5=10.5:1.5:0.075:0.15:1.425$.

Example 3

Synthesis of $Li_{10.5}Ge_{1.5}Sb_{0.15}P_{1.35}S_{12}$

A Ge- and Sb-substituted LGPS having the above composition was obtained in the same method as in Example 1 except that weighing was performed so that the molar ratio at the time of weighing was $Li_2S:GeS_2:Sb_2S_3:S:P_2S_5=10.5:1.5:0.15:0.3:1.35$.

Example 4

Synthesis of $Li_{10.65}Ge_{1.65}Sb_{0.075}P_{1.275}S_{12}$

A Ge- and Sb-substituted LGPS having the above composition was obtained in the same method as in Example 1 except that weighing was performed so that the molar ratio at the time of weighing was $Li_2S:GeS_2:Sb_2S_3:S:P_2S_5=10.65:1.65:0.075:0.15:1.275$.

Comparative Example 1

Synthesis of $Li_{10}Ge_1P_2Si_2$

An LGPS having the above composition was obtained in the same method as in Example 1 except that weighing was performed so that the molar ratio at the time of weighing was $Li_2S:GeS_2:Sb_2S_3:S:P_2S_5=10:1:0:0:2$.

Comparative Example 2

Synthesis of $Li_{10}Ge_1Sb_{0.075}P_{1.925}S_{12}$

An Sb-substituted LGPS having the above composition was obtained in the same method as in Example 1 except that weighing was performed so that the molar ratio at the time of weighing was $Li_2S:GeS_2:Sb_2S_3:S:P_2S_5=10:1:0.075:0.15:1.925$.

Comparative Example 3

Synthesis of $Li_{10}Ge_1Sb_{0.15}P_{1.85}S_{12}$

An Sb-substituted LGPS having the above composition was obtained in the same method as in Example 1 except that weighing was performed so that the molar ratio at the time of weighing was $Li_2S:GeS_2:Sb_2S_3:S:P_2S_5=10:1:0.15:0.3:1.85$.

Comparative Example 4

Synthesis of $Li_{10}Ge_1Sb_{0.3}P_{1.7}S_{12}$

An Sb-substituted LGPS having the above composition was obtained in the same method as in Example 1 except that weighing was performed so that the molar ratio at the time of weighing was $Li_2S:GeS_2:Sb_2S_3:S:P_2S_5=10:1:0.3:0.6:1.7$.

Comparative Example 5

Synthesis of $Li_{10}Ge_1Sb_{0.5}P_{1.5}S_{12}$

An Sb-substituted LGPS having the above composition was obtained in the same method as in Example 1 except that weighing was performed so that the molar ratio at the time of weighing was $Li_2S:GeS_2:Sb_2S_3:S:P_2S_5=10:1:0.5:1:1.5$.

Comparative Example 6

Synthesis of $Li_{10.5}Ge_{1.8}Sb_{0.075}P_{1.125}S_{12}$

A Ge- and Sb-substituted LGPS having the above composition was obtained in the same method as in Example 1 except that weighing was performed so that the molar ratio at the time of weighing was $Li_2S:GeS_2:Sb_2S_3:S:P_2S_5=10.8:1.8:0.075:0.15:1.125$.

[Measurement of Ionic Conductivity]

Using solid electrolytes of Examples 1 to 4 and Comparative Examples 1 to 6, the ionic conductivity of the solid electrolyte was evaluated under the following conditions.

100 mg of the solid electrolyte was filled into a cylinder and pressing was performed at 6 t to prepare a pressed powder cell. When this was put into a desiccator, the impedance was measured in a thermostatic chamber at 25° C. The ionic conductivity was calculated from the obtained resistance value and sample thickness.

The results are shown in FIG. 1.

The ionic conductivity was 8.56 mS/cm in Example 1, 8.33 mS/cm in Example 2, 5.3 mS/cm in Example 3, 5.2 mS/cm in Example 4, 8.11 mS/cm in Comparative Example 1, 6.2 mS/cm in Comparative Example 2, 5.51 mS/cm in Comparative Example 3, 5.3 mS/cm in Comparative Example 4, 2.12 mS/cm in Comparative Example 5, and 1.87 mS/cm in Comparative Example 6.

[Evaluation Results]

FIG. 1 is a diagram showing the results of the ionic conductivity with respect to the amount (mol) x of P in the sulfide-based solid electrolytes of Examples 1 to 4 and Comparative Examples 1 to 6.

As shown in FIG. 1, based on the results of Comparative Examples 1 to 5, it can be understood that desired ionic conductivity could not be obtained when the amount of P substituted with Sb was 0.5 mol or more. The sulfide-based solid electrolytes of Examples 1 to 4 had higher ionic conductivity than the sulfide-based solid electrolytes of Comparative Examples 5 and 6, had a high ionic conductivity of 5 mS/cm or more at room temperature of 25° C., and had a smaller amount of P in the composition than the sulfide-based solid electrolytes of Comparative Examples 1 to 4, and thus had higher water resistance than those of Comparative Examples 1 to 4, and both high ionic conductivity and high water resistance could be achieved.

What is claimed is:

1. A sulfide-based solid electrolyte having a composition represented by $Li_aGe_{1+b}Sb_cP_{2-b-c}S_{12}$, wherein $10 \leq a \leq 10.65$, $0.35 \leq b \leq 0.65$, and $0.075 \leq c \leq 0.15$ are satisfied.

2. The sulfide-based solid electrolyte according to claim 1, wherein $0.35 \leq b \leq 0.5$ is satisfied.

* * * * *